United States Patent
Xu et al.

(10) Patent No.: US 11,055,567 B2
(45) Date of Patent: Jul. 6, 2021

(54) UNSUPERVISED EXCEPTION ACCESS DETECTION METHOD AND APPARATUS BASED ON ONE-HOT ENCODING MECHANISM

(71) Applicant: Tsinghua University, Beijing (CN)

(72) Inventors: Ke Xu, Beijing (CN); Yi Zhao, Beijing (CN); Qi Tan, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 183 days.

(21) Appl. No.: 16/463,310

(22) PCT Filed: Sep. 25, 2018

(86) PCT No.: PCT/CN2018/107342
§ 371 (c)(1),
(2) Date: May 22, 2019

(87) PCT Pub. No.: WO2019/085691
PCT Pub. Date: May 9, 2019

(65) Prior Publication Data
US 2020/0065616 A1    Feb. 27, 2020

(30) Foreign Application Priority Data
Oct. 30, 2017    (CN) .......................... 201711032284.2

(51) Int. Cl.
*G06K 9/62* (2006.01)
*G06F 40/284* (2020.01)
*H04L 29/06* (2006.01)

(52) U.S. Cl.
CPC ......... *G06K 9/6231* (2013.01); *G06F 40/284* (2020.01); *G06K 9/6223* (2013.01);
(Continued)

(58) Field of Classification Search
CPC .. G06K 9/6231; G06K 9/6223; G06K 9/6257; G06K 9/6272; G06F 40/284; H04L 63/0236
See application file for complete search history.

(56) References Cited

U.S. PATENT DOCUMENTS

| 7,574,692 B2* | 8/2009 | Herscu ...................... G06F 8/51 |
| | | 717/114 |
| 8,126,825 B2* | 2/2012 | Guyon ................... G06N 20/00 |
| | | 706/12 |

(Continued)

FOREIGN PATENT DOCUMENTS

| CN | 107229945 | 10/2017 |
| CN | 107276805 | 10/2017 |
| CN | 107798235 | 3/2018 |

OTHER PUBLICATIONS

SIPO, Office Action for CN Application No. 201711032284.2, dated Jul. 16, 2019.
WIPO, ISR for PCT/CN2018/107342, Jan. 4, 2019.

*Primary Examiner* — Gregory M Desire
(74) *Attorney, Agent, or Firm* — Hodgson Russ LLP

(57) ABSTRACT

The present disclosure provides an unsupervised exception access detection method and apparatus based on one-hot encoding mechanism. The method includes: encoding each test URL sample by using one-hot encoding mechanism, to obtain a high-dimensional vector; inputting the high-dimensional vector into a pre-built deep autoencoder network for compression and dimension reduction processing, to obtain a two-dimensional vector; performing visualization operation on the two-dimensional vectors by using a two-dimensional coordinate system, to obtain visualized test URL samples; performing a cluster analysis on all visualized test URL samples by using a K-means algorithm, to divide the test URL sample set into a first type and a second type of (Continued)

URL sets; comparing sample sizes of the first type and second type of URL sets, determining the URL set with a larger sample size as a normal URL set, and determining the URL set with a smaller sample size as an abnormal URL set.

12 Claims, 4 Drawing Sheets

(52) U.S. Cl.
CPC ......... *G06K 9/6257* (2013.01); *G06K 9/6272* (2013.01); *H04L 63/0236* (2013.01)

(56) References Cited

U.S. PATENT DOCUMENTS

| | | | | |
|---|---|---|---|---|
| 9,367,799 | B2* | 6/2016 | Hall | G06F 16/2425 |
| 9,703,885 | B2* | 7/2017 | Scheevel | H04L 61/6009 |
| 9,720,751 | B2* | 8/2017 | Hotta | H04L 41/5009 |
| 9,749,341 | B2* | 8/2017 | Liu | H04W 4/00 |
| 10,075,463 | B2* | 9/2018 | Zhang | G06F 21/00 |
| 10,324,973 | B2* | 6/2019 | Circlaeys | G06F 16/489 |
| 10,498,773 | B2* | 12/2019 | Park | H04L 63/205 |
| 10,813,577 | B2* | 10/2020 | Brister | A61B 5/1411 |
| 2016/0065600 | A1* | 3/2016 | Lee | H04L 63/1416 |
| | | | | 726/23 |
| 2016/0364428 | A1* | 12/2016 | Harris | G06F 16/93 |
| 2018/0041536 | A1* | 2/2018 | Berlin | G06N 3/08 |
| 2018/0329795 | A1* | 11/2018 | Byrd | G06F 9/44 |
| 2020/0065616 | A1* | 2/2020 | Xu | G06K 9/6223 |

\* cited by examiner

UNSUPERVISED EXCEPTION ACCESS DETECTION METHOD AND APPARATUS BASED ON ONE-HOT ENCODING MECHANISM

CROSS-REFERENCE TO RELATED APPLICATIONS

This application is a U.S. national phase application of International Application No. PCT/CN2018/107342, filed on Sep. 25, 2018, which claims priority to and benefits of Chinese Patent Application Serial No. 201711032284.2, filed on Oct. 30, 2017. The entire disclosures of the aforementioned applications are incorporated herein by reference.

FIELD

The present disclosure relates to the next generation Internet network security technology field, and more particularly, to an unsupervised exception access detection method and apparatus based on one-hot encoding mechanism.

BACKGROUND

With the continuous popularization of network technologies, the number of services provided by the network for human beings increases exponentially. Faced with the various network services and links provided by the next generation Internet, how to ensure that users access to the normal websites is of great significance. Traditional abnormal URL (Uniform Resource Locator) detection is mainly based on fixed rules. However, faced with a large number of URLs growing exponentially, the limitations of fixed rules are obvious due to various characteristics of abnormal URLs, and only known abnormal URLs can be identified. However, the characteristics of most abnormal URLs are unknown, while it is difficult to accurately detect abnormal URLs with unknown characteristics based on the fixed rules, thus increasing the risk of users' access to the Internet.

Through the analysis on a large number of URLs in the Internet, it can be found that, although the number of URLs is huge and it is difficult to determine the characteristics of abnormal URLs, most of the existing URLs are normal ones and have similar characteristics. Considering that machine learning can efficiently obtain some internal characteristics of data, there are some methods using machine learning to detect abnormal URL access. For example, based on the statistical method, the exception access is detected through the statistical characteristics such as the frequency of the URL being accessed by the user and the character length of the URL itself. Or, there are some methods based on natural language processing principle, which detect exception access by parsing the URL.

Therefore, how to distinguish normal URLs from abnormal URLs more accurately becomes a technical problem to be solved urgently.

SUMMARY

Embodiments of the present disclosure aim to solve at least one of the technical problems in the related art to at least some extent.

To this end, a first objective of the present disclosure is to propose an unsupervised exception access detection method based on one-hot encoding mechanism, which can, under the premise that the characteristics of abnormal URLs are unknown, accurately detect the abnormal URLs by using a bi-gram model, a one-hot encoding mechanism, a deep autoencoder network and cluster analysis, thus avoiding exception access and avoiding the harm caused by malicious access. In addition, it solves the problem that it is difficult to detect abnormal URLs accurately based on fixed rules and has characteristics of high detection accuracy and strong robustness, and can be widely used in the next generation Internet network security technology field, such as exception access detection and exception traffic detection. Through unsupervised learning, abnormal URLs can be accurately identified when the characteristics of abnormal URLs are not clear and abnormal samples are very few. Moreover, the training phase of the deep autoencoder network can be completed offline, and after the deep autoencoder network is established, the detection speed is very fast, which greatly improves the detection efficiency of detecting exception access.

To this end, a second objective of the present disclosure is to propose an unsupervised exception access detection apparatus based on one-hot encoding mechanism.

In order to achieve the above objectives, embodiments of a first aspect of the present disclosure provide an exception access detection method based on one-hot encoding mechanism, including:

encoding each test URL sample in a test URL sample set by using one-hot encoding mechanism, to obtain a high-dimensional vector corresponding to each test URL sample, wherein, the test URL sample set includes at least one test URL sample;

inputting the high-dimensional vector corresponding to each test URL sample into a pre-built deep autoencoder network for compression and dimension reduction processing, to obtain a two-dimensional vector corresponding to each test URL sample;

performing visualization operation on the two-dimensional vector corresponding to each test URL sample by using a two-dimensional coordinate system, to obtain visualized test URL samples;

performing cluster analysis on all visualized test URL samples by using a K-means algorithm, to divide the test URL sample set into a first type of URL set and a second type of URL set;

comparing a sample size of the first type of URL set with that of the second type of URL set, determining the URL set with a larger sample size as a normal URL set, and determining the URL set with a smaller sample size as an abnormal URL set.

As the method described above, encoding each test URL sample in the test URL sample set by using the one-hot encoding mechanism, to obtain the high-dimensional vector corresponding to each test URL sample, comprises:

preprocessing the test URL sample set by using a bi-gram model, to obtain a sequence corresponding to each test URL sample;

encoding the sequence corresponding to each test URL sample in the test URL sample set by using the one-hot encoding mechanism, to obtain the high-dimensional vector corresponding to each test URL sample.

As the method described above, performing the cluster analysis on all the visualized test URL samples by using the K-means algorithm, to divide the test URL sample set into the first type of URL set and the second type of URL set, includes:

selecting two visualized test URL samples from all the visualized test URL samples, taking one visualized test URL sample selected as a first centroid and taking the other visualized test URL sample selected as a second centroid;

for each visualized test URL sample not selected, calculating a first distance between the visualized test URL sample and the first centroid and a second distance between the visualized test URL sample and the second centroid;

comparing the first distance with the second distance, and determining a category of the centroid corresponding to a smaller distance as a category of the visualized test URL sample;

classifying each visualized test URL sample corresponding to the category of the first centroid into the first type of URL set, and classifying each visualized test URL sample corresponding to the category of the second centroid into the second type of URL set.

As the method described above, selecting two visualized test URL samples from all visualized test URL samples, taking one visualized test URL sample selected as a first centroid and taking the other visualized test URL sample selected as a second centroid, includes:

performing at least one round of selecting two visualized test URL samples from all visualized test URL samples, taking one visualized test URL sample selected as the first centroid and taking the other visualized test URL sample selected as the second centroid;

for each visualized test URL sample not selected, calculating the first distance between the visualized test URL sample and the first centroid and the second distance between the visualized test URL sample and the second centroid, includes:

for a current round, obtaining the first centroid and the second centroid of a previous round;

determining whether the category of the first centroid of the current round is the same as the category of the first centroid of the previous round, and determining whether the category of the second centroid of the current round is the same as the category of the second centroid of the previous round;

if the category of the first centroid of the current round is different from the category of the first centroid of the previous round and the category of the second centroid of the current round is different from the category of the second centroid of the previous round, for each visualized test URL sample not selected in the current round, calculating a first distance of the current round between the visualized test URL sample and the first centroid of the current round as well as a second distance of the current round between the visualized test URL sample and the second centroid of the current round.

As the method described above, before encoding each test URL sample in the test URL sample set by using one-hot encoding mechanism, to obtain the high-dimensional vector corresponding to each test URL sample, the method further includes:

preprocessing a training URL sample set by using a bi-gram model, to obtain a sequence corresponding to each training URL sample, wherein, the training URL sample set comprises at least one training URL sample;

encoding the sequence corresponding to each training URL sample in the training URL sample set, to obtain a high-dimensional vector corresponding to each training URL sample; and training the high-dimensional vector corresponding to each training URL sample based on a preset algorithm, and constructing the deep autoencoder network.

As the method described above, the deep autoencoder network includes:

an input layer, an output layer and at least one hidden layer;

wherein, neurons in the hi-th hidden layer are denoted as:

$$y_{hi}=f(WX+B)$$

where, $X \in R^{m*l}$ is an output vector of a previous layer, m is the number of neurons in the previous layer, $W \in R^{n*m}$ is a weight matrix, n is the number of the neurons in the hi-th hidden layer, $B \in R^{n*l}$ is an offset, and f is a Rectified Linear Units activation function.

As the method described above, the preset algorithm is a minimizing loss function.

In order to achieve the above objectives, embodiments of a second aspect of the present disclosure provide an unsupervised exception access detection apparatus based on one-hot encoding mechanism, including:

a first obtaining module, configured to encode each test URL sample in a test URL sample set by using one-hot encoding mechanism, to obtain a high-dimensional vector corresponding to each test URL sample, wherein, the test URL sample set includes at least one test URL sample;

a second obtaining module, configured to input the high-dimensional vector corresponding to each test URL sample into a pre-built deep autoencoder network for compression and dimension reduction processing, to obtain a two-dimensional vector corresponding to each test URL sample;

a third obtaining module, configured to perform visualization operation on the two-dimensional vector corresponding to each test URL sample, to obtain visualized test URL samples;

a clustering module, configured to perform a cluster analysis on all the visualized test URL samples by using a K-means algorithm, to divide the test URL sample set into a first type of URL set and a second type of URL set;

a determining module, configured to compare the sample size of the first type of URL set with that of the second type of URL set, determine the URL set with a larger sample size as a normal URL set, and determine the URL set with a smaller sample size as an abnormal URL set.

As the apparatus described above, the first obtaining module includes a first unit and a second unit;

the first unit is configured to preprocess the test URL sample set by using a bi-gram model, to obtain a sequence corresponding to each test URL sample;

the second unit is configured to encode the sequence corresponding to each test URL sample in the test URL sample set by using the one-hot encoding mechanism, to obtain the high-dimensional vector corresponding to each test URL sample.

As the apparatus described above, the first obtaining module is further configured to preprocess a training URL sample set by using a bi-gram model to obtain a sequence corresponding to each training URL sample, wherein, the training URL sample set includes at least one training URL sample; encode the sequence corresponding to each training URL sample in the training URL sample set by using the one-hot encoding mechanism, to obtain a high-dimensional vector corresponding to each training URL sample;

the apparatus further includes:

a building module, configured to train the high-dimensional vector corresponding to each training URL sample based on a preset algorithm, and construct the deep autoencoder network.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

In order to clearly illustrate technical solutions of embodiments of the present disclosure or the related art, a brief description of drawings used in embodiments or the related art is given below. Obviously, the drawings in the following descriptions are only part embodiments of the present disclosure, and for those skilled in the art, other drawings can be obtained according to these drawings without creative labor.

DETAILED DESCRIPTION

Reference will be made clearly and completely to technical solutions in the embodiments of the present disclosure with accompanying drawings. Obviously, the embodiments described here are only part of the embodiments of the present disclosure and are not all embodiments of the present disclosure. Based on the embodiments of the present disclosure, other embodiments obtained by those skilled in the art without creative labor are within scope of the present disclosure.

The unsupervised exception access detection method and apparatus based on one-hot encoding mechanism according to embodiments of the present disclosure will be described below with reference to the accompanying drawings.

Figure 1:
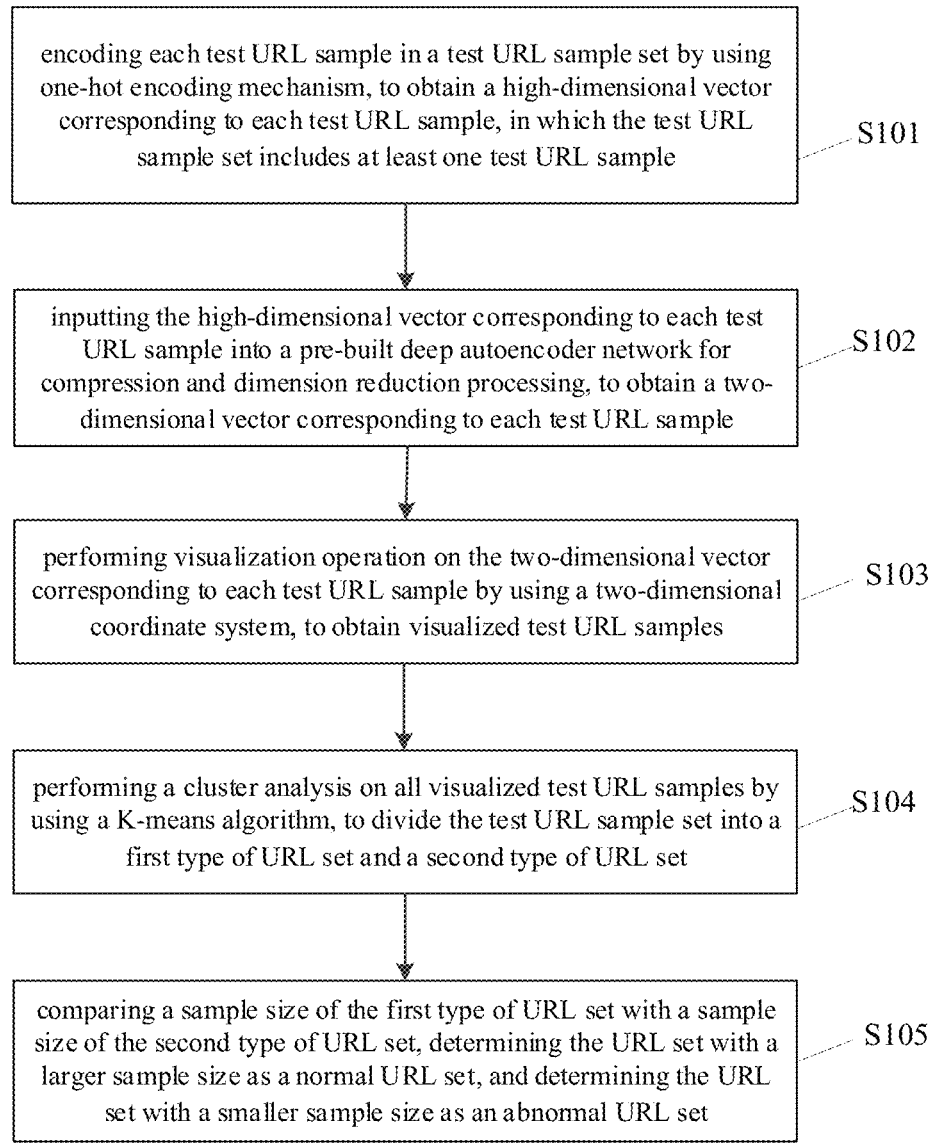
FIG. 1 is a flow chart of an unsupervised exception access detection method based on one-hot encoding mechanism according to an embodiment of the present disclosure.

FIG. 1 is a flow chart of an unsupervised exception access detection method based on one-hot encoding mechanism according to an embodiment of the present disclosure.

As illustrated in FIG. 1, the unsupervised exception access detection method based on one-hot encoding mechanism according to this embodiment includes followings.

At S101, each test URL sample in a test URL sample set is encoded by using one-hot encoding mechanism, to obtain a high-dimensional vector corresponding to each test URL sample, in which the test URL sample set includes at least one test URL sample.

Specifically, the test URL samples in the embodiment can be understood as the URLs to be accessed, and the test URL sample set may include both normal URLs and abnormal URLs. Therefore, it is necessary to distinguish the test URL sample set, that is, multiple URLs to be accessed, to accurately detect the abnormal URLs, so as to avoid exception access and avoid the harm caused by malicious access.

In this embodiment, each test URL sample is encoded using the one-hot encoding (also known as one-bit effective encoding) mechanism, to vectorize each test URL sample. In this way, the test URL samples can be input into a deep autoencoder network for analysis and processing, which facilitates detecting abnormal URLs accurately later.

In one possible implementation, the specific implementation of step S101 is as follows.

At S11, the test URL sample set is preprocessed by using a bi-gram model to obtain a sequence corresponding to each test URL sample.

Specifically, the bi-gram model is used to determine a correlation degree between words in natural language processing. Here, the basic concepts of the bi-gram model are used, that is, the sequence is formed by taking 2 characters as one group and taking 1 as a step. Take the URL "HTTP://www.baidu.com" as an example, after the preprocessing of the bi-gram model, the corresponding sequence is as follows:

{ht tt tp p: :/ // /w ww ww w. .b ba ai id du u. .c co om}.

For example, for a binary combination of two characters, since each bit has 256 possibilities (including 128 characters in the ASCII table and 128 characters in the ASCII extended table), there are 256*256=65536 possible binary combinations. A part of the binary combination is listed as follows:

$$\left\{\begin{array}{l}00,\\01,\\\vdots\\a.,\\a/,\\\vdots\\ba,\\bb,\\\vdots\\b.,\\b/,\\\vdots\\.b,\\\vdots\end{array}\right\}, \text{total } lenght = 65536$$

At S12, the sequence corresponding to each test URL sample in the test URL sample set is encoded by using the one-hot encoding mechanism, to obtain a high-dimensional vector corresponding to each test URL sample.

Specifically, if the element in the above binary combination has appeared in the sequence obtained after preprocessing the test URL sample by the bi-gram model in step S11, then after the one-hot encoding mechanism, the corresponding position is 1. For example, ba and .b have appeared in the sequence {ht tt tp p: :/ // /w ww ww w. .b ba ai id du u. .c co om} obtained after preprocessing "http://www.baidu.com" by the bi-gram model, then the corresponding position is 1. For elements that have not appeared in the sequence, the corresponding position is 0 after the one-hot encoding mechanism. For example, elements like 00, 01, a., a/, bb, b., b/, have not appeared in the sequence {ht tt tp p: :/ // /w ww ww w. .b ba ai id du u. .c co om} obtained after preprocessing "http://www.baidu.com" by the bi-gram model, the corresponding positions are 0 after encoding by the one-hot encoding mechanism. Finally, the following binary vector composed of 0 and 1 with the length of 65536 is obtained. Obviously, the obtained binary vector is a higher-dimensional vector.

$$\begin{Bmatrix} 00, \\ 01, \\ \vdots \\ a., \\ a/, \\ \vdots \\ ba, \\ bb, \\ \vdots \\ b., \\ b/, \\ \vdots \\ .b, \\ \vdots \end{Bmatrix} \xrightarrow{one-hot} \begin{Bmatrix} 0, \\ 0, \\ \vdots \\ 0, \\ 0, \\ \vdots \\ 1, \\ 0, \\ \vdots \\ 0, \\ 0, \\ \vdots \\ 1, \\ \vdots \end{Bmatrix}, \text{total length} = 65536$$

At S102, the high-dimensional vector corresponding to each test URL sample is input into a pre-built deep autoencoder network for compression and dimension reduction processing to obtain a two-dimensional vector corresponding to each test URL sample.

In the embodiment, the pre-built deep autoencoder network is an unsupervised generation model in deep learning, which consists of an input layer, an output layer and multiple hidden layers, and can be divided into encoding network and decoding network according to function. The encoding network is used to reduce the dimension of data and compress the high-dimensional data into low-dimensional data. The decoding network is used for reconstruction, to reconstruct high-dimensional data from compressed low-dimensional data.

Specifically, the vectorized test URL samples obtained through one-hot encoding mechanism are input into the deep autoencoder network, in which the encoding network is used to perform compression and dimension reduction processing on the vectorized test URL samples, to obtain the two-dimensional vectors of the test URL samples.

At S103, visualization operation is performed on the two-dimensional vector corresponding to each test URL sample by using a two-dimensional coordinate system, to obtain visualized test URL samples.

Specifically, the two-dimensional vector of the test URL sample in the embodiment can be understood as two neurons of the test URL sample, and the visualization operation can be performed by taking these two neurons as X-axis and Y-axis values respectively. The two-dimensional coordinate system consists of the X-axis and Y-axis.

At S104, cluster analysis is performed on all visualized test URL samples by using a K-means algorithm, to divide the test URL sample set into a first type of URL set and a second type of URL set.

At S105, the sample size of the first type of URL set is compared with that of the second type of URL set, the URL set with a larger sample size is determined as a normal URL set, and the URL set with a smaller sample size is determined as an abnormal URL set.

In the embodiment, the K-means algorithm is a clustering algorithm from bottom to top, and is also unsupervised learning. Through the K-means algorithm, the test URL sample set is divided into the first type of URL set and the second type of URL set. Most samples in the test URL sample set are normal URLs, and the characteristics of normal URLs are mostly similar; however, there are few abnormal URLs, which are different from each other. Therefore, after clustering, large-sample and dense clustering corresponds to normal URLs, whereas small-sample and scattered clustering corresponds to abnormal URLs. In the embodiment, the test URL samples detected as normal URLs are included in the normal URL set, and the test URL samples detected as abnormal URLs are included in the abnormal URL set, such that the identification of URLs to be accessed is achieved, and the abnormal URLs can be detected accurately, thus avoiding exception access and avoiding the harm caused by malicious access.

The unsupervised exception access detection method based on one-hot encoding mechanism provided by the embodiment includes: encoding each test URL sample in the test URL sample set by using one-hot encoding mechanism, to obtain the high-dimensional vector corresponding to each test URL sample, wherein, the test URL sample set includes at least one test URL sample; inputting the high-dimensional vector corresponding to each test URL sample into the pre-built deep autoencoder network for compression and dimension reduction processing to obtain the two-dimensional vector corresponding to each test URL sample; performing visualization operation on the two-dimensional vector corresponding to each test URL sample by using the two-dimensional coordinate system, to obtain visualized test URL samples; performing cluster analysis on all visualized test URL samples by using the K-means algorithm, to divide the test URL sample set into the first type of URL set and the second type of URL set; comparing the sample size of the first type of URL set and that of the second type of URL set, determining the URL set with a larger sample size as a normal URL set, and determining the URL set with a smaller sample size as an abnormal URL set. The method can, under the premise that the characteristics of abnormal URLs are unknown, accurately detect the abnormal URLs by using the bi-gram model, the one-hot encoding mechanism and the deep autoencoder network, thus avoiding exception access and the harm caused by malicious access. In addition, it solves the problem that it is difficult to detect abnormal URLs accurately based on the fixed rules and has characteristics of high detection accuracy and strong robustness, and can be widely used in the next generation Internet network security technology field, such as exception access detection and exception traffic detection. Through unsupervised learning, abnormal URLs can be accurately identified when the characteristics of abnormal URLs are not clear and abnormal samples are very few. Moreover, the training phase of the deep autoencoder network can be completed offline, and after the deep autoencoder network is established, the detection speed is very fast, which greatly improves the detection efficiency of detecting exception access.

Figure 2:
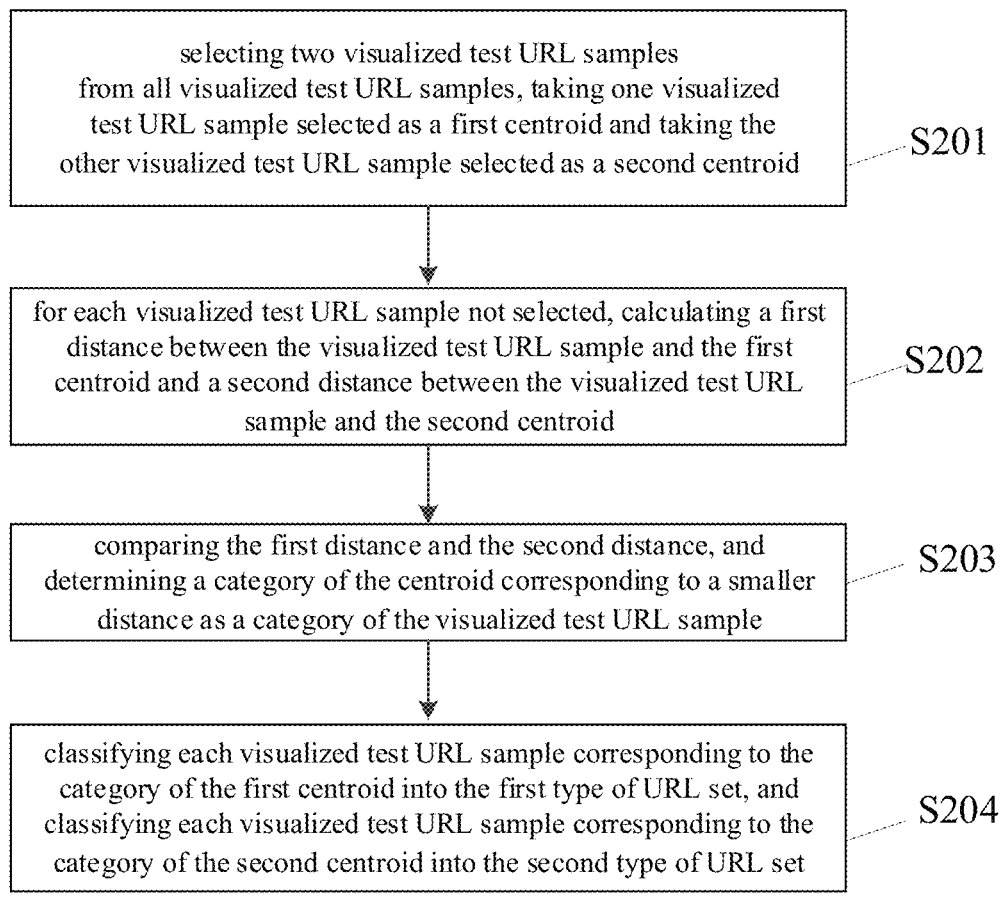
FIG. 2 is a flow chart of an unsupervised exception access detection method based on one-hot encoding mechanism according to another embodiment of the present disclosure.

FIG. 2 is a flow chart of an unsupervised exception access detection method based on one-hot encoding mechanism according to another embodiment of the present disclosure. The embodiment mainly optimizes "performing cluster analysis on all visualized test URL samples by using the K-means algorithm to divide the test URL sample set into the first type of URL set and the second type of URL set" in the above embodiment.

As illustrated in FIG. 2, the unsupervised exception access detection method based on one-hot encoding mechanism according to the embodiment includes followings.

At S201, two visualized test URL samples are selected from all visualized test URL samples, one visualized test URL sample selected is taken as a first centroid and the other visualized test URL sample selected is taken as a second centroid.

For example, the number of all visualized test URL samples is 500. Two visualized test URL samples are selected from the 500 samples, one of which is taken as the first centroid and the other one is taken as the second centroid. Here, the first centroid and the second centroid can be understood as two kinds of test URL samples.

At S202, for each visualized test URL sample not selected, a first distance between the visualized test URL sample and the first centroid is calculated and a second distance between the visualized test URL sample and the second centroid is calculated.

At S203, the first distance is compared with the second distance, and a category of the centroid corresponding to a smaller distance as a category of the visualized test URL sample.

For example, after selecting the first centroid and the second centroid, cluster analysis is performed on the remaining 498 URL samples, that is, determining which ones of the remaining 498 test URL samples can be classified to the category of the first centroid and which ones can be classified to the category of the second centroid.

In the embodiment, each test URL sample is visualized in the two-dimensional coordinate system, and thus "performing cluster analysis on the remaining 498 test URL samples" becomes calculating the distance between two points in the coordinate system. That is, for each of the 498 test URL samples, it is not difficult to calculate the first distance between each test URL sample and the first centroid, or the second distance between each test URL sample and the second centroid.

Specifically, the first distance and the second distance may be calculated according to the following formula:

$$k^{(i)} = \underset{j}{\arg\min} \|x^{(i)} - \mu_j\|^2$$

where, $x^{(i)}$ is the i-th test URL sample, $\mu_j$ is the j-th centroid, j is 1 or 2; $k^{(i)}$ is the category of the i-th sample, the calculation method is to take the category with the smallest distance between the test URL sample and the centroid as the category of the current test URL sample.

At S204, each visualized test URL sample corresponding to the category of the first centroid is classified into the first type of URL set, and each visualized test URL sample corresponding to the category of the second centroid is classified into the second type of URL set.

For example, for one test URL sample in the 498 test URL samples, if its first distance from the first centroid is less than its second distance from the second centroid, it is determine that the test URL sample belongs to the same category as the first centroid; otherwise, it is determined that the test URL sample belongs to the same category as the second centroid. In this way, the 498 test URL samples can be divided into two categories: the category to which the test URL samples belong and the first centroid belongs; and the category to which the test URL samples belong and the second centroid belongs, realizing the cluster analysis on all test URL samples, that is, dividing all test URL samples into the first type of URL set and the second type of URL set.

With the unsupervised exception access detection method based on one-hot encoding mechanism according to the embodiment, by comparing the distance between the test URL sample and the first centroid and the distance between the test URL sample and the second centroid, whether the category of each test URL sample is the same as that of the first centroid or that of the second centroid is determined, realizing the cluster analysis on all test URL samples. The method has advantages of low cost, high accuracy and strong robustness, and can effectively identify a variety of abnormal URLs with unknown characteristics and avoid the occurrence of exception access.

Further, the present embodiment optimizes "performing cluster analysis on all visualized test URL samples by using the K-means algorithm, to divide the test URL sample set into the first type of URL set and the second type of URL set" in the above embodiment. Specifically, the specific implementation of "selecting the first centroid and the second centroid several times to cluster all the test URL samples" includes the following steps.

At S21, at least one round of selecting two visualized test URL samples from all visualized test URL samples is performed, one visualized test URL sample selected is taken as the first centroid and the other visualized test URL sample selected is taken as the second centroid. Step S22 is executed subsequently.

At S22, for the current round, the first centroid and the second centroid of a previous round are obtained, and it is determined whether the category of the first centroid of the current round is the same as the category of the first centroid of the previous round, and whether the category of the second centroid of the current round is the same as the category of the second centroid of the previous round. Then, step S23 or step S28 is executed.

At S23, if the category of the first centroid of the current round is different from the category of the first centroid of the previous round and the category of the second centroid of the current round is different from the category of the second centroid of the previous round, for each visualized test URL sample not selected in the current round, a first distance of the current round between the visualized test URL sample and the first centroid of the current round as well as a second distance of the current round between the visualized test URL sample and the second centroid of the current round are calculated. Step S24 is executed subsequently.

At S24, the first distance of the current round is compared with the second distance of the current round, and the category of the centroid corresponding to a smaller distance is determined as the category of the visualized test URL sample of the current round. Then, step S25 is executed.

At S25, each visualized test URL sample corresponding to the category of the first centroid of the current round is classified into the first type of URL set, and each visualized test URL sample corresponding to the category of the second centroid of the current round is classified into the second type of URL set, and step S26 is executed.

At S26, the first distance of the current round is compared with the second distance of the current round, and the category of the centroid corresponding to a smaller distance is determined as the category of the visualized test URL sample of the current round. Then, step S27 is executed.

At S27, each visualized test URL sample corresponding to the category of the first centroid of the current round is classified into the first type of URL set, and each visualized test URL sample corresponding to the category of the second centroid of the current round is classified into the second type of URL set.

At S28, if the category of the first centroid of the current round is the same as the category of the first centroid of the previous round and the category of the second centroid of the current round is the same as the category of the second centroid of the previous round, the first type of URL set in the previous round is determined as the final first type of URL set, and the second type of URL set in the previous round is determined as the final second type of URL set.

Specifically, in the embodiment, when it is determined at step S22 that, the category of the first centroid of the current round is different from the category of the first centroid of the previous round, and the category of the second centroid of the current round is different from the category of the second centroid of the previous round, steps S23 to S27 correspond to performing the cluster analysis on all test URL samples again. When it is determined at step S22 that, the category of the first centroid of the current round is same as the category of the first centroid of the previous round, and the category of the second centroid of the current round is same as the category of the second centroid of the previous round, performing the cluster analysis on all test URL samples again is terminated, at this time, the first type of URL set in the previous round is determined as the final first type of URL set, and the second type of URL set in the previous round is determined as the final second type of URL set.

In the embodiment, the first centroid and the second centroid are selected for many times, and cluster analysis is performed on all test URL samples for many times, until the selected first centroid and second centroid keep unchanged. This method can identify various abnormal URLs with unknown characteristics more efficiently and better avoid the occurrence of exception access.

Figure 3:
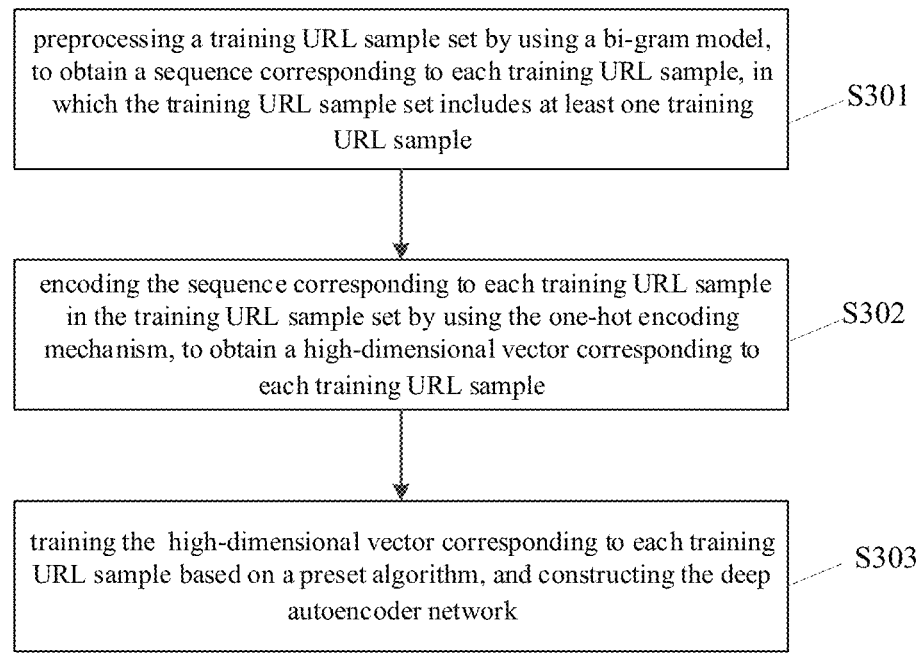
FIG. 3 is a flow chart of an unsupervised exception access detection method based on one-hot encoding mechanism according to yet another embodiment of the present disclosure.

FIG. 3 is a flow chart of an unsupervised exception access detection method based on one-hot encoding mechanism according to yet another embodiment of the present disclosure. On the basis of the above embodiments, the embodiment optimizes how to construct the deep autoencoder network.

As illustrated in FIG. 3, the unsupervised exception access detection method based on one-hot encoding mechanism according to the embodiment includes followings.

At S301, a training URL sample set is preprocessed by using the bi-gram model, to obtain a sequence corresponding to each training URL sample, in which, the training URL sample set includes at least one training URL sample.

At S302, the sequence corresponding to each training URL sample in the training URL sample set is encoded by the one-hot encoding mechanism, to obtain the high-dimensional vector corresponding to each training URL sample.

With respect to the specific implementation of step S301 and step S302 in this embodiment, reference can be made to the implementation of step S101 in the above embodiment, which is not elaborated here.

At S303, the high-dimensional vector corresponding to each training URL sample is trained based on a preset algorithm, and the deep autoencoder network is constructed.

Specifically, the deep autoencoder network is an unsupervised generation model in deep learning, which consists of an input layer, an output layer and multiple hidden layers, and can be divided into encoding network and decoding network according to function. The encoding network is used to reduce the dimension of data and compress the high-dimensional data into low-dimensional data; the decoding network is used for reconstruction, to reconstruct high-dimensional data from compressed low-dimensional data.

In the embodiment, the deep autoencoder network may include an input layer, an output layer and at least one hidden layer.

The two-dimensional vector of the training URL sample is taken as the input vector of the deep autoencoder network, and the input is reconstructed with the generation function of the whole deep autoencoder network. Since the deep autoencoder network is built based on the full connection structure, the neurons in the hi-th hidden layer of the deep autoencoder can be denoted as:

$$y_{hi} = f(WX+B)$$

where, $X \in R^{m*l}$ is the output vector of the previous layer; m is the number of the neurons of the previous layer; $W \in R^{n*m}$ is a weight matrix; n is the number of the neurons in the hi-th hidden layer; $B \in R^{n*l}$ is an offset; f is the Rectified Linear Units activation function. Alternatively, f is defined as: f=max(0, x). It should be noted that, when hi=1, X is the input vector, that is, the high-dimensional vector corresponding to each training URL sample in step S302.

Preferably, the preset algorithm is the minimizing loss function, which is defined as the error between the input vector and the reconstruction obtained through the deep encoder, and is defined as:

$$L = \frac{1}{N}\sum_{i=1}^{N}|y_i - y_i'|^2$$

where, N is the sample size corresponding to the input vector, $y_i$ is the input vector, $y_i'$ is the reconstruction of the deep autoencoder network, and the minimizing loss function is the mean square error of the two. It should be noted that $y_i$ being the input vector can be understood as the high-dimensional vectors corresponding to respective training URL samples in step S302. For example, the sample size of the training URL sample set is 100, and thus N is 100.

With the unsupervised exception access detection method based on one-hot encoding mechanism according to the embodiment, the training URL sample set is preprocessed by using a bi-gram model to obtain the sequence corresponding to each test URL sample, in which the training URL sample set includes at least one training URL sample, the sequence corresponding to each training URL sample in the training URL sample set is encoded by using the one-hot encoding mechanism to obtain the high-dimensional vector corresponding to each training URL sample, and the high-dimensional vector corresponding to each training URL sample is trained based on the preset algorithm, and the deep autoencoder network is constructed. This method can train the deep autoencoder network in advance. In this way, when the abnormal URL is detected later, it only needs to compress the preprocessed high-dimensional vector according to the encoding part of the trained deep autoencoder network, and then perform the cluster analysis through the coordinate system visualization, identify the abnormal URLs. This method has the advantages of low computing cost, high accuracy and strong robustness, and can identify various abnormal URLs with unknown characteristics efficiently and avoid the occurrence of exception access.

Figure 4:
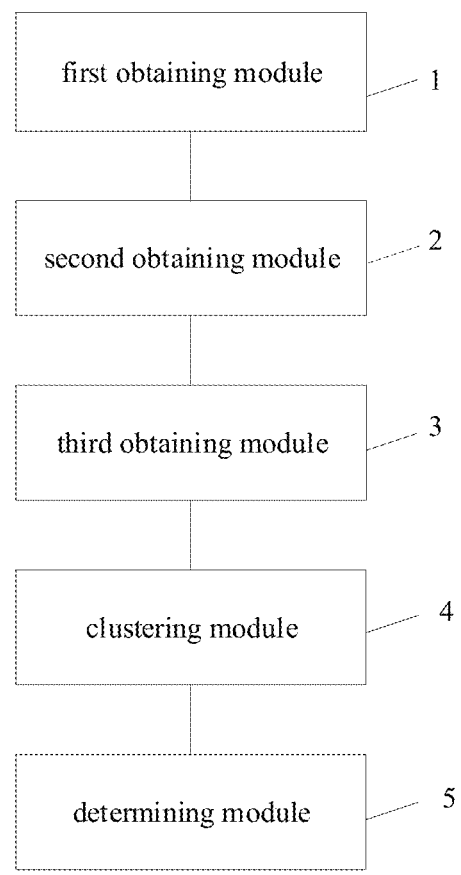
FIG. 4 is a block diagram of an unsupervised exception access detection apparatus based on one-hot encoding mechanism according to an embodiment of the present disclosure.

FIG. 4 is a block diagram of an unsupervised exception access detection apparatus based on one-hot encoding mechanism according to an embodiment of the present disclosure.

As illustrated in FIG. 4, the unsupervised exception access detection apparatus based on one-hot encoding mechanism according to the embodiment includes a first obtaining module 1, a second obtaining module 2, a third obtaining module 3, a clustering module 4, and a determining module 5.

The first obtaining module 1 is configured to encode each test URL sample in a test URL sample set by using one-hot encoding mechanism, to obtain a high-dimensional vector corresponding to each test URL sample, wherein, the test URL sample set includes at least one test URL sample.

The second obtaining module 2 is configured to input the high-dimensional vector corresponding to each test URL sample into a pre-built deep autoencoder network for compression and dimension reduction processing to obtain a two-dimensional vector corresponding to each test URL sample.

The third obtaining module 3 is configured to perform visualization operation on the two-dimensional vector corresponding to each test URL sample by using a two-dimensional coordinate system, to obtain visualized test URL samples.

The clustering module 4 is configured to perform cluster analysis on all visualized test URL samples by using a K-means algorithm, to divide the test URL sample set into a first type of URL set and a second type of URL set.

The determining module 5 is configured to compare the sample size of the first type of URL set and that of the second type of URL set, determine the URL set with a larger sample size as a normal URL set, and determine the URL set with a smaller sample size as an abnormal URL set.

Further, the first obtaining module 1 includes a first unit and a second unit.

The first unit is configured to preprocess the test URL sample set by using a bi-gram model, to obtain a sequence corresponding to each test URL sample.

The second unit is configured to encode the sequence corresponding to each test URL sample in the test URL sample set by using the one-hot encoding mechanism to obtain the high-dimensional vector corresponding to each test URL sample.

Further, the clustering module 4 includes a selecting unit, a calculating unit, a comparing unit, a classifying unit.

The selecting unit is configured to select two visualized test URL samples from all visualized test URL samples, take one visualized test URL sample selected as a first centroid and the other visualized test URL sample selected as a second centroid.

Specifically, the selecting unit is configured to perform at least one round of selecting two visualized test URL samples from all visualized test URL samples, and take one of which as the first centroid and the other one of which as the second centroid.

The calculating unit is configured to, for each visualized test URL sample not selected, calculate a first distance between the visualized test URL sample and the first centroid as well as a second distance between the visualized test URL sample and the second centroid.

Specifically, the calculating unit is configured to, for a current round, obtain the first centroid and the second centroid of the previous round; determine whether the category of the first centroid of the current round is the same as the category of the first centroid of the previous round, and determine whether the category of the second centroid of the current round is the same as the category of the second centroid of the previous round; if the category of the first centroid of the current round is different from the category of the first centroid of the previous round, and the category of the second centroid of the current round is different from the category of the second centroid of the previous round, for each visualized test URL sample not selected in the current round, calculate a first distance of the current round between the visualized test URL sample and the first centroid of the current round as well as a second distance of the current round between the visualized test URL sample and the second centroid of the current round.

The comparing unit is configured to compare the first distance and the second distance, and determine the category of the centroid corresponding to a smaller distance as the category of the visualized test URL sample.

The classifying unit is configured to classify all visualized test URL samples corresponding to the category of the first centroid into the first type of URL set, and classify all visualized test URL samples corresponding to the category of the second centroid into the second type of URL set.

Further, the first obtaining module 1 is further configured to preprocess a training URL sample set by using the bi-gram model to obtain the sequence corresponding to each training URL sample, in which the training URL sample set includes at least one training URL sample; encode the sequence corresponding to each training URL sample in the training URL sample set by using the one-hot encoding mechanism to obtain the high-dimensional vector corresponding to each training URL sample.

The apparatus further includes a building module.

The building module is configured to train the high-dimensional vector corresponding to each training URL sample based on a preset algorithm, and construct the deep autoencoder network. The preset algorithm is the minimizing loss function.

Specifically, the deep autoencoder network includes an input layer, an output layer and at least one hidden layer.

Neurons in the hi-th hidden layer are denoted as:

$$y_{hi}=f(WX+B)$$

where, $X \in Rm*1$ is the output vector of the previous layer; m is the number of the neurons in the previous layer; $W \in Rn*m$ is a weight matrix; n is the number of the neurons in the hi-th hidden layer; $B \in Rn*1$ is an offset; f is the Rectified Linear Units activation function.

With respect to the apparatus in this embodiment, specific implementation of operations performed by various modules have been described in detail in embodiments regarding the method, which will not be elaborated here.

With the unsupervised exception access detection apparatus based on one-hot encoding mechanism according to the embodiment, each test URL sample in the test URL sample set is encoded by using the one-hot encoding mechanism to obtain the high-dimensional vector corresponding to each test URL sample, in which the test URL sample set includes at least one test URL sample; the high-dimensional vector corresponding to each test URL sample is input into the pre-built deep autoencoder network for compression and dimension reduction processing to obtain the two-dimensional vector corresponding to each test URL sample; visualization operation is performed on the two-dimensional vector corresponding to each test URL sample by using the two-dimensional coordinate system to obtain visualized test URL samples; cluster analysis is performed on all visualized test URL samples by using the K-means algorithm, to divide the test URL sample set into the first type of URL set and the second type of URL set; the sample size of the first type of URL set is compared with that of the second type of URL set, the URL set with a larger sample size is determined as a normal URL set, and the URL set with a smaller sample size is determined as an abnormal URL set. The apparatus can, under the premise that the characteristics of abnormal URLs are unknown, accurately detect abnormal URLs by using the bi-gram model, the one-hot encoding mechanism and the deep autoencoder network, thus avoiding exception access and the harm caused by malicious access. In addition, it solves the problem that it is difficult to detect abnormal URLs accurately based on fixed rules and has the characteristics of high detection accuracy and strong robustness, and can be widely used in the next generation Internet network security technology field, such as exception access detection and exception traffic detection. Through unsupervised learning, abnormal URLs can be accurately identified when the characteristics of abnormal URLs are not clear and abnormal samples are very few. Moreover, the training phase of the deep autoencoder network can be completed offline, and after the establishment of the deep autoencoder network, the detection speed is very fast, which greatly improves the detection efficiency of exception access.

In order to realize the above embodiments, the present disclosure also proposes a computer device. The computer device includes a memory, a processor and a computer program stored in the memory and executable by the processor. When the processor executes the computer program, the unsupervised exception access detection method based on one-hot encoding mechanism according to the above embodiments is performed. In order to realize the above embodiments, the present disclosure also proposes a non-transitory computer readable storage medium, stored thereon with a computer program that, when executed by a processor, performs the unsupervised exception access detection method based on one-hot encoding mechanism according to the above embodiments.

It should be noted that for embodiments of the apparatus, the computer device and the storage medium, since they are basically similar to embodiments of the method, the description is relatively simple, and please refer to the description of embodiments of the method for relevant information.

It is appreciated that, the steps in the method described in embodiments of the present disclosure may be sequenced, merged and deleted according to actual needs. Accordingly, units in the apparatus described in embodiments of the present disclosure may also be combined, divided and deleted according to actual needs.

The above embodiments are only better embodiments of the present disclosure and certainly do not limit the scope of the claims of the present disclosure.

Those ordinary skilled in the art can understand and realize all or part of the process the above embodiments, and the equivalent changes made in accordance with the claim of the present disclosure shall still be covered by the scope of the present disclosure.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

It should be noted that, in order to simplify description the present disclosure, embodiments of the present disclosure are expressed as a series of action combinations, but it would be appreciated by those skilled in the art that the present disclosure is not limited to the order of the actions, because some steps may be executed in other orders or be executed at the same time. In addition, it would be further appreciated by those skilled in the art that embodiments described in the specification are preferred embodiments, actions and modules involved therein may not be necessary for the present disclosure.

In above embodiments, descriptions of respective embodiments are emphasized differently, and parts that are not detailed in some embodiments can refer to relevant descriptions of other embodiments.

In several embodiments provided in the present disclosure, it is understood that the disclosed device may be implemented in other ways. For example, the embodiments of the device described above are schematic; for example, the division of the units is merely a logical function division, which may be implemented in other ways, for example, multiple units or components may be combined or integrated into another system, or some features can be ignored or not implemented. On the other hand, the mutual coupling or direct coupling or communication connection shown or discussed may be indirect coupling or communication connection through some interfaces, devices or units, may be electrical or other forms.

The units described as separate parts may be or may not be physically separated, and the parts displayed as units may be or may not be physical units, that means, they can be in one place or distributed over multiple network units. Some or all of these units may be selected according to actual needs for realizing the purpose of embodiments of the present disclosure.

In addition, individual functional units in the embodiments of the present disclosure may be integrated in one processing unit or may be separately physically present, or two or more units may be integrated in one unit. The integrated unit as described above may be achieved in the form of hardware, or may be achieved in the form of a software functional unit.

If the integrated unit is achieved in the form of a software functional unit and sold or used as a separate product, the integrated unit may also be stored in a computer readable storage medium. Based on such understanding, the technical solution of the present disclosure, in essence or as a contribution to the existing technology, or all or part of the technical solution, can be reflected in the form of software products. The computer software product is stored in a storage medium and includes instructions to enable a computer device (which may be a personal computer, server or network device, etc.) to perform all or part of the steps described in each embodiment of the present disclosure. The aforementioned storage media include: U disk, ROM (Read Only Memory), RAM (Random Access Memory), mobile hard disk, disk or optical disk and other media that can store program codes.

As described above, the above embodiments are used only to illustrate the technical solution to be applied, not to limit it; Although the detailed description of the present disclosure in the light of the foregoing embodiments, those skilled in the art should appreciated that, they may still modify the technical solution recorded in the foregoing embodiments or replace some of the technical features equally; such modifications or substitutions shall not remove the nature of the corresponding technical solution from the scope of the technical solution of embodiments of the present disclosure.

The above embodiments are only better embodiments of the present disclosure and are not intended to limit the scope of protection of the present disclosure. Any modification, replacement, improvement, and so on, made in the spirit and principles of the present disclosure shall be in the scope of protection of the present disclosure.

What is claimed is:

1. An unsupervised exception access detection method based on one-hot encoding mechanism, comprising:
    encoding each test URL sample in a test URL sample set by using one-hot encoding mechanism, to obtain a high-dimensional vector corresponding to each test URL sample, wherein, the test URL sample set includes at least one test URL sample;
    inputting the high-dimensional vector corresponding to each test URL sample into a pre-built deep autoencoder network for compression and dimension reduction processing, to obtain a two-dimensional vector corresponding to each test URL sample;
    performing visualization operation on the two-dimensional vector corresponding to each test URL sample by using a two-dimensional coordinate system, to obtain visualized test URL samples;
    performing a cluster analysis on all the visualized test URL samples by using a K-means algorithm, to divide the test URL sample set into a first type of URL set and a second type of URL set; and
    comparing a sample size of the first type of URL set with that of the second type of URL set, determining the URL set with a larger sample size as a normal URL set, and determining the URL set with a smaller sample size as an abnormal URL set;
    wherein, encoding each test URL sample in a test URL sample set by using one-hot encoding mechanism, to obtain the high-dimensional vector corresponding to each test URL sample, comprises:
        preprocessing the test URL sample set by using a bi-gram model, to obtain a sequence corresponding to each test URL sample; and
        encoding the sequence corresponding each test URL sample in the test URL sample set by using the one-hot encoding mechanism, to obtain the high-dimensional vector corresponding to each test URL sample.

2. The method according to claim 1, wherein, performing the cluster analysis on all the visualized test URL samples by using the K-means algorithm, to divide the test URL sample set into the first type of URL set and the second type of URL set, comprises:
    selecting two visualized test URL samples from all the visualized test URL samples, taking one visualized test URL sample selected as a first centroid and taking the other visualized test URL sample selected as a second centroid;
    for each visualized test URL sample not selected, calculating a first distance between the visualized test URL sample and the first centroid and a second distance between the visualized test URL sample and the second centroid;
    comparing the first distance with the second distance, and determining a category of the centroid corresponding to a smaller distance as a category of the visualized test URL sample; and
    classifying each visualized test URL sample corresponding to the category of the first centroid into the first type of URL set, and classifying each visualized test URL sample corresponding to the category of the second centroid into the second type of URL set.

3. The method according to claim 2, wherein,
    selecting two visualized test URL samples from all the visualized test URL samples, taking one visualized test URL sample selected as a first centroid and taking the other visualized test URL sample selected as a second centroid, comprises:
        performing at least one round of selecting two visualized test URL samples from all the visualized test URL samples, and taking one visualized test URL sample selected as the first centroid and the other visualized test URL sample selected as the second centroid;
    for each visualized test URL sample not selected, calculating the first distance between the visualized test URL sample and the first centroid and the second distance between the visualized test URL sample and the second centroid, comprises:
        for a current round, obtaining the first centroid and the second centroid of a previous round;
        determining whether the category of the first centroid of the current round is the same as the category of the first centroid of the previous round, and determining whether the category of the second centroid of the current round is the same as the category of the second centroid of the previous round; and
        if the category of the first centroid of the current round is different from the category of the first centroid of the previous round and the category of the second centroid of the current round is different from the category of the second centroid of the previous round, for each visualized test URL sample not selected in the current round, calculating a first distance of the current round between the visualized test URL sample and the first centroid of the current round as well as a second distance of the current round between the visualized test URL sample and the second centroid of the current round.

4. The method according to claim 1, wherein, before encoding each test URL sample in the test URL sample set by using one-hot encoding mechanism, to obtain the high-dimensional vector corresponding to each test URL sample, the method further comprises:

preprocessing a training URL sample set by using a bi-gram model, to obtain a sequence corresponding to each training URL sample, wherein, the training URL sample set comprises at least one training URL sample;

encoding the sequence corresponding to each training URL sample in the training URL sample set, to obtain a high-dimensional vector corresponding to each training URL sample; and training the high-dimensional vector corresponding to each training URL sample based on a preset algorithm, and constructing the deep autoencoder network.

5. The method according to claim 4, wherein, the deep autoencoder network comprises:

an input layer, an output layer and at least one hidden layer;

wherein, neurons in a hi-th hidden layer are denoted as:

$$y_{hi}=f(WX+B)$$

where, $X \in R^{m*1}$ is an output vector of a previous layer, m is a number of neurons in the previous layer, $W \in R^{n*m}$ is a weight matrix, n is a number of the neurons in the hi-th hidden layer, $B \in R^{n*1}$ is an offset, and f is a Rectified Linear Units activation function.

6. The method according to claim 4, wherein, the preset algorithm is a minimizing loss function.

7. An unsupervised exception access detection apparatus based on one-hot encoding mechanism, comprising:

a processor; and a memory, configured to store a computer program executable by the processor, wherein the processor is configured to run the computer program stored in the memory, so as to:

encode each test URL sample in a test URL sample set by using one-hot encoding mechanism, to obtain a high-dimensional vector corresponding to each test URL sample, wherein, the test URL sample set includes at least one test URL sample;

input the high-dimensional vector corresponding to each test URL sample into a pre-built deep autoencoder network for compression and dimension reduction processing, to obtain a two-dimensional vector corresponding to each test URL sample;

perform visualization operation on the two-dimensional vector corresponding to each test URL sample, to obtain visualized test URL samples;

perform a cluster analysis on all the visualized test URL samples by using a K-means algorithm, to divide the test URL sample set into a first type of URL set and a second type of URL set; and compare a sample size of the first type of URL set with that of the second type of URL set, determine the URL set with a larger sample size as a normal URL set, and determine the URL set with a smaller sample size as an abnormal URL set;

wherein the processor is configured to:

preprocess the test URL sample set by using a bi-gram model, to obtain a sequence corresponding to each test URL sample; and encode the sequence corresponding to each test URL sample in the test URL sample set by using the one-hot encoding mechanism, to obtain the high-dimensional vector corresponding to each test URL sample.

8. The apparatus according to claim 7, wherein the processor is configured to:

select two visualized test URL samples from all visualized test URL samples, take one visualized test URL sample selected as a first centroid and take the other visualized test URL sample selected as a second centroid;

for each visualized test URL sample not selected, calculate a first distance between the visualized test URL sample and the first centroid as well as a second distance between the visualized test URL sample and the second centroid;

compare the first distance and the second distance, and determine a category of the centroid corresponding to a smaller distance as a category of the visualized test URL sample; and classify all visualized test URL samples corresponding to the category of the first centroid into the first type of URL set, and classify all visualized test URL samples corresponding to the category of the second centroid into the second type of URL set.

9. The apparatus according to claim 8, wherein, the processor is configured to:

perform at least one round of selecting two visualized test URL samples from all visualized test URL samples, take one visualized test URL sample selected as the first centroid and take the other visualized test URL sample selected as the second centroid; and for a current round, obtain the first centroid and the second centroid of a previous round; determine whether the category of the first centroid of the current round is the same as the category of the first centroid of the previous round, and determine whether the category of the second centroid of the current round is the same as the category of the second centroid of the previous round; if the category of the first centroid of the current round is different from the category of the first centroid of the previous round and the category of the second centroid of the current round is different from the category of the second centroid of the previous round, for each visualized test URL sample not selected in the current round, calculate a first distance of the current round between the visualized test URL sample and the first centroid of the current round as well as a second distance of the current round between the visualized test URL sample and the second centroid of the current round.

10. The apparatus according to claim 7, wherein, the processor is configured to:

preprocess a training URL sample set by using a bi-gram model to obtain a sequence corresponding to each training URL sample, wherein, the training URL sample set includes at least one training URL sample;

encode the sequence corresponding to each training URL sample in the training URL sample set by using the one-hot encoding mechanism, to obtain a high-dimensional vector corresponding to each training URL sample; and train the high-dimensional vector corresponding to each training URL sample based on a preset algorithm, and construct the deep autoencoder network.

11. The apparatus according to claim 10, wherein the deep autoencoder network comprises:

an input layer, an output layer and at least one hidden layer;

wherein, neurons in a hi-th hidden layer are denoted as:

$$y_{hi}=f(WX+B)$$

where, $X \in R^{m*1}$ is an output vector of a previous layer, m is a number of neurons in the previous layer, $W \in R^{n*m}$ is a weight matrix, n is a number of the neurons in the hi-th hidden layer, $B \in R^{N*1}$ is an offset, and f is a Rectified Linear Units activation function.

12. A non-transitory computer readable storage medium, stored thereon with a computer program that, when executed by a processor, performs a unsupervised exception access detection method, the method comprising:

encoding each test URL sample in a test URL sample set by using one-hot encoding mechanism, to obtain a high-dimensional vector corresponding to each test URL sample, wherein, the test URL sample set includes at least one test URL sample;

inputting the high-dimensional vector corresponding to each test URL sample into a pre-built deep autoencoder network for compression and dimension reduction processing, to obtain a two-dimensional vector corresponding to each test URL sample;

performing visualization operation on the two-dimensional vector corresponding to each test URL sample by using a two-dimensional coordinate system, to obtain visualized test URL samples;

performing a cluster analysis on all the visualized test URL samples by using a K-means algorithm, to divide the test URL sample set into a first type of URL set and a second type of URL set; and comparing a sample size of the first type of URL set with that of the second type of URL set, determining the URL set with a larger sample size as a normal URL set, and determining the URL set with a smaller sample size as an abnormal URL set;

wherein, encoding each test URL sample in a test URL sample set by using one-hot encoding mechanism, to obtain the high-dimensional vector corresponding to each test URL sample, comprises:

preprocessing the test URL sample set by using a bi-gram model, to obtain a sequence corresponding to each test URL sample; and encoding the sequence corresponding each test URL sample in the test URL sample set by using the one-hot encoding mechanism, to obtain the high-dimensional vector corresponding to each test URL sample.

* * * * *